Figure 1:
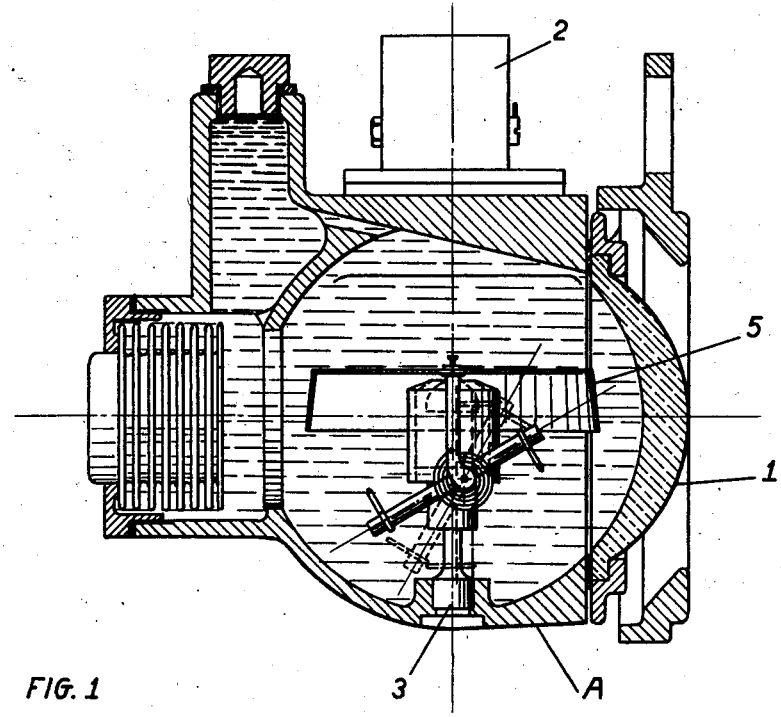

June 13, 1939. P. KOLLSMAN 2,161,871
AUTOMATIC MEANS FOR VARYING COMPASS CARD OSCILLATION
Original Filed May 17, 1933  2 Sheets-Sheet 1

June 13, 1939.  P. KOLLSMAN  2,161,871
AUTOMATIC MEANS FOR VARYING COMPASS CARD OSCILLATION
Original Filed May 17, 1933  2 Sheets-Sheet 2

Inventor
Paul Kollsman
Gunter Rathke
By
his Attorney

Patented June 13, 1939

2,161,871

UNITED STATES PATENT OFFICE 2,161,871

AUTOMATIC MEANS FOR VARYING COMPASS CARD OSCILLATION

Paul Kollsman, New York, N. Y.

Original application May 17, 1933, Serial No. 671,548. Divided and this application July 30, 1937, Serial No. 156,551

11 Claims. (Cl. 33—223)

This application is a division of my co-pending application, Serial No. 671,548, filed May 17, 1933, for Automatic means for varying compass card oscillations.

One difficulty in connection with the use of compasses on airships and other mounts subject to decided changes of direction is the vexatious oscillation of the compass card or other movable direction indicating element. The oscillations are caused by torques acting in opposite directions on the rotatable directional element having inertia. Every one is familiar with the troublesome oscillation of the ordinary magnetic compass needle which, under agitation, is practically never at rest, but oscillates clockwise and counter-clockwise, to east and to west from a true north indication.

In connection with airship compasses, a damping liquid is employed to damp this vexatious oscillation of the compass card. The more the damping, however, the less sensitive is the compass and the greater its lag before assuming a true directional indication. The situation, therefore, is one in which oscillation of a troublesome degree has, before my invention, been one of the things tolerated.

The broad object of my invention is to minimize this oscillation while, at the same time, preserving the normal sensitivity of the compass.

A further object of my invention is automatically to preserve substantially uniform the tendency to oscillate under varying conditions.

It is a further object of my invention to provide satisfactory means for accomplishing the above functions. Objectively, I employ various methods and means chosen with particular regard to the change of conditions tending to disturb the normal period of oscillation.

It is still a further object automatically to vary the torques tending to set up oscillations more specifically, to reduce the torques during the time of, and in response to disturbing influences such as evolutions of a craft tending to start the oscillation and also to restore to normal magnitude the torques after the disturbing oscillation creating condition has ceased to exist.

The principal cause in aeroplane service for starting an oscillation is banking into a curve. I purpose, therefore, to use a change in condition brought about by the banking into a curve temporarily to diminish the effectiveness of the torque tending to set up an oscillation. In this connection, I take advantage of centrifugal force acting in combination with the force of gravity. The resultant of these two forces, which is a force of the same nature as gravity, a "quasi-gravity," acts upon the compass. I do not desire it to be understood that it is gravity or centrifugal force or their resultant which produce the torque tending to set up an oscillation. In the case of the magnetic compass the force is the earth's magnetism acting on the magnetic means of the compass which is opposed by the inertia of the mass possessing parts of the compass about the compass axis. I therefore purpose to employ the increase in the quasi-gravitational force to reduce the magnetic torque tending to set up the oscillation.

Stated more specifically, the purpose of my invention is to effect an automatic control of the oscillation of the indicating part of the pivoted assemblage of a compass without resorting to an excessive degree of damping and so that when the carrier, such as a ship, depending upon the compass gets into a straight line course there will be a minimum duration of the oscillation, and, at the same time, freedom to assume a true directional indication for this assemblage is maintained.

I appreciate that the pivoted assemblage of a compass is subjected to an oscillation retarding force usually by means of immersing it in a viscous liquid while the directional urge imparted to this pivoted assemblage is the torque exerted by a coupling of the direction finding force within this assemblage with an external force, such as the earth's magnetism. I also appreciate the fact that the period of oscillation of the pivoted assemblage is a function of this force couple or torque and the moment of inertia of the pivoted assemblage.

In carrying into effect the objects of my invention, one instance has to do with a lowering of temperature when the ship attains a great altitude. This usually increases the viscosity of the damping liquid. When this viscosity increases, I may tend to maintain normal oscillation by increasing the oscillation producing torque, or by reducing the grip of the damping liquid upon the pivoted assemblage. This part of my invention is more fully described in my co-pending application, Serial No. 671,548, of which this application is a division.

Another method and means which I contemplate employing is to utilize the increase in quasi-gravitational force which occurs when a ship is caused to move in a curved path to reduce the directional force or torque tending to set up an oscillation of the pivoted assemblage.

In this application of one of my inventions, I contemplate causing the increased quasi-gravitational force to decrease the directional maintaining component of local magnetic element thereby decreasing its turning effort upon the pivoted assemblage. First, I contemplate accomplishing this by inclining the directional magnet relatively to the rest of the pivoted assemblage. Second, I contemplate doing this by reducing the strength of the magnetic field of the local magnetic means forming a part of the pivoted assemblage. It is, of course, within my understanding that a combination of these two means and methods is within the purport of my invention and disclosed herein.

More generally, it is an object of my invention to decrease the oscillation of the directing pivoted assemblage of a compass.

The above and further objects and advantages of my invention will better be understood from the following description in connection with the accompanying drawings, showing for purely illustrative purposes embodiments of this invention. It is to be understood, however, that the description is not to be taken in a limiting sense, the scope of this invention being defined in the appended claims.

Figure 2:
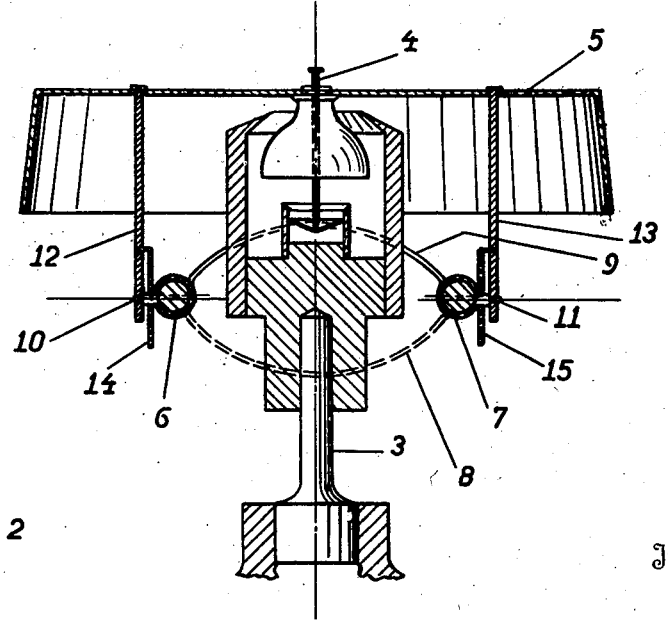
Figure 4:
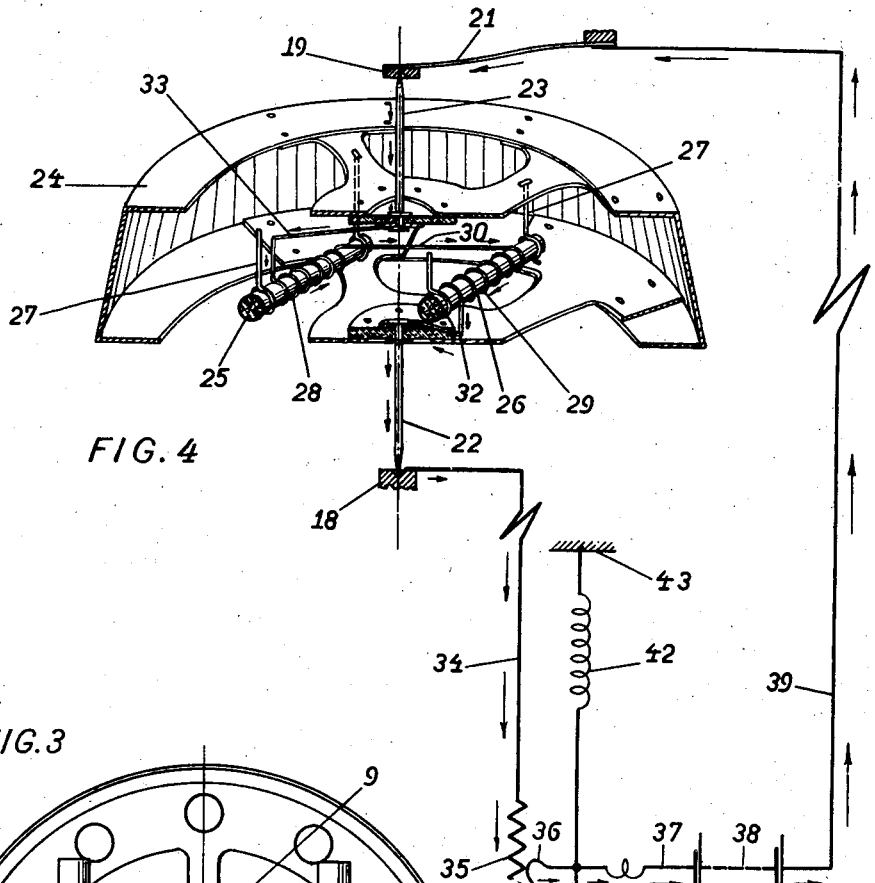
Figure 3:
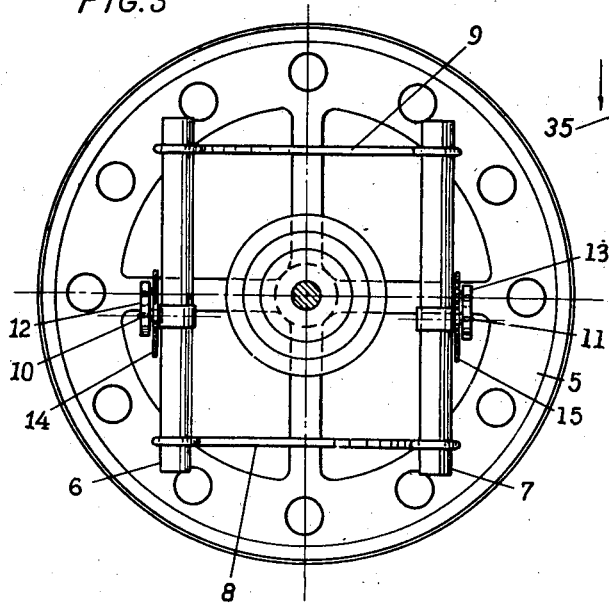

In the drawings, Fig. 1 is a vertical cross-section of a magnetic compass embodying my invention; Fig. 2 is a vertical cross-section drawn to an enlarged scale of the pivoted assemblage within the compass of Fig. 1 but shown at right angles thereto and with the local magnetic means rotated into a horizontal position; Fig. 3 is a bottom plan view of the parts shown in Fig. 2 with obscuring parts removed; Fig. 4 is a fractional semi-diagrammatic vertical section in perspective of a modified form of my invention in which the strength of the local magnetism is varied automatically.

*Embodiment of Figs. 1, 2 and 3*

Any convenient preferably liquid filled casing or mount A providing the vision window 1 and with or without a deviation compensator 2 is adapted to be mounted upon the carrier, such as an aeroplane. In the embodiments shown, any approved post or pillar construction 3 serves to pivot the pivoted assemblage as by means of the pivot pin 4. By pivoted assemblage I mean all the parts which move in response to the external direction imparting force. In the present embodiment they comprise the compass card spider 5 and local directional magnets 6 and 7. The bar magnets 6 and 7 are locally framed one to the other by the arcuate cross-wires 8 and 9 which grasp the opposite ends of the respective bar magnets so that the magnets 6, 7 and bridging wires 8 and 9 form a swiveling assemblage mounted on the trunnions 10 and 11 to swivel in the lower ends of the bracket bars 12 and 13 fixed to the compass card spider 5. It should be noted particularly from Figs. 1 and 3 that the trunnions 10 and 11 are not mid-positioned on the bar magnets, but are closer to the right hand end thereof as viewed in Fig. 1 so that there is a tendency under the urge of gravity or quasi-gravity (i. e., the resultant of gravity and centrifugal force) for the swiveled assemblage to swing down into the position shown in dash lines in Fig. 1. This tendency is opposed by a pair of spiral springs 14 and 15 fixed at one end to the trunnions and at the other end to the bracket arms 12 and 13 respectively. The normal position for these bar magnets is preferably at an angle to the horizontal proportional to the inclination of the earth's magnetic field. It should also particularly be noted that the arcuate shaping of the bridging wires 8 and 9 permits a swinging of these bar magnets into a substantially vertical position, that is, parallel to the pivoting axis of the pivoted assemblage in which position zero torque is exerted upon the pivoted assemblage.

The functioning of this invention is dependent upon the fact that the banking of an airship into a curve of necessity causes a centrifugal force to act in combination with the force of gravity, the axis of the pivoted assemblage approximating that of the resulting force in direction. A greater force tends to swivel the magnets 6 and 7, say, into the dash line position of Fig. 1, or even more nearly approaching parallelism with the axis of the pivoted assemblage. In this way, the disturbance caused by banking into a curved path and tending to cause a displacement of the direction indicating assemblage is offset by reducing during such disturbance the torque tending to set up and maintain an oscillation.

In connection with this form of my invention and the description of its operation, it is of course to be understood that the suspension of the bar magnets about an axis spaced from the center of gravity of the magnets is for the purpose of making them pendulous, and that they may also be swiveled centrally and an additional mass provided at their appropriate ends to effect the same pendulousness in response to an increase in quasi-gravitational force.

*Embodiment of Fig. 4*

In connection with the compass parts shown in this figure, diagrammatically for the most part, the pivoted assemblage is all the mechanism between the pivoting bearings 18 and 19, which are metallic and serve to maintain good electrical connection with the pivot pins 22 and 23. It may be preferred to mount the bearing 19 resiliently as by means of a downwardly pressing spring 21. Fixed to the compass card spider 24 are properly positioned electromagnets 25 and 26. The mounting may be as indicated by means of stub wires 27 pendant from the compass card spider 24. The windings 28 and 29 of these electromagnets are connected in series by a lead 30 having regard to the direction of turn so as to maintain north polarity at similar ends of the magnets. The terminal leads 32 and 33 of these magnets are connected to pivot pins 22 and 23 respectively. An electrical circuit through the electromagnets is thus completed through wires 34, rheostat resistance 35, movable contact 36, wire 37, source of potential such as battery 38, and wire 39. A mass 41 is normally balanced against the force of quasi-gravity by spring 42 attached to a fixed part 43 of the carrier or mount. As quasi-gravity, such as the resultant of centrifugal force and gravity, increases, more of the resistance 35 is introduced into the circuit to reduce the field of the electromagnets 25 and 26. Thus, when the airship carrying a compass embodying the invention of Fig. 6 banks into a curve, the oscillation producing torque is reduced automatically, and when the ship straightens out, the normal condition is automatically restored in a manner different from that accomplished in the embodiments of Figs. 1, 2 and 3, but nevertheless effectively.

Obviously the present invention is not restricted to the particular embodiments herein shown and described. Moreover, it is not indispensable that all of the features of this invention be used conjointly since they may advantageously be employed in various combinations and subcombinations.

What I claim and desire to secure by United States Letters Patent is:

1. In a compass having a casing and a pivot therein; a member supported by said pivot for rotation in azimuth; magnetic means connected to said member to exert, upon deviation of said member from a predetermined position in azimuth, a torque on said member for returning said member to said predetermined position; means including a damping fluid exerting a torque on said member in opposition to the return movement; and means operable from a point outside said casing and operatively connected to one of said torque exerting means for varying the relative magnitudes of the torques exerted on said member by said magnetic and said opposing torque exerting means at a given deviation of said member in azimuth, whereby the period of oscillation of said member about the predetermined position in azimuth is adjustable without interfering with the free movement of said member.

2. In a compass having a casing and a pivot therein; a member supported by said pivot for rotation in azimuth; a magnetic element mounted on said member tending, upon deviation of said member from a predetermined position in azimuth, to return said member to said predetermined position by a torque in azimuth; damping means tending to oppose movements in azimuth of said member by a torque exerted on said member upon movements of said member in azimuth; and means operable from a point outside said casing and operatively connected to said magnetic element for increasing and decreasing the magnitude of the torque exerted on said member by said magnetic element at a given deviation of said member in azimuth, whereby the period of oscillation of the compass is adjustable without interfering with the free movement of said member.

3. In a compass for use on movable craft a pivot; a member supported by said pivot for rotation in azimuth; a magnetic element mounted on said member tending, upon deviation of said member from a predetermined position in azimuth, to return said member to said predetermined position by a torque in azimuth said element constituting a first torque exerting means; damping means including a damping liquid tending to oppose movement in azimuth of said member by a torque exerted on said member in azimuth, said damping means constituting a second torque exerting means; and means responsive to evolutions of the craft, said evolution responsive means being operatively connected to one of said torque exerting means automatically to vary, in response to such evolutions, the relative magnitudes of the torques exerted on said member by said magnetic element and said damping means, respectively at a given deviation of said member in azimuth, whereby the period of oscillation of said member about the predetermined position in azimuth is adjustable.

4. In a compass for use on movable craft a pivot; a member supported by said pivot for rotation in azimuth; a magnetic element connected to said member tending, upon deviation of said member from a predetermined position in azimuth, to return said member to said predetermined position by a torque in azimuth; damping means tending to oppose movements in azimuth of said member by a torque exerted on said member in azimuth; and means responsive to evolutions of the craft connected to said magnetic means automatically to increase and decrease, in response to such evolutions of the craft, the magnitude of the torque exerted on said member by said magnetic element, whereby the period of oscillation of the compass is adjustable.

5. In a compass a member mounted for rotation in azimuth; magnetic torque exerting means connected thereto to exert, upon deviation of said member from a predetermined position in azimuth, a torque on said member for returning said member to said predetermined position; opposing torque exerting means exerting a torque on said member in opposition to the return movement; and means responsive to accelerations acting on said compass, said acceleration responsive means being effective automatically to vary in accordance with such accelerations the relative magnitudes of the torques exerted on said member by said magnetic and said opposing torque exerting means at a given deviation of said member in azimuth, whereby the period of oscillation of said member about the predetermined position in azimuth is adjustable in response to acceleration forces acting on the compass.

6. In a compass for use on movable craft a pivot; a member supported by said pivot for rotation in azimuth; a magnetic element mounted on said member tending, upon deviation of said member from a predetermined position in azimuth, to return said member to said predetermined position by a torque in azimuth; damping means tending to oppose movements in azimuth of said member by a torque exerted on said member in azimuth; and means responsive to accelerations acting on the craft and connected to said magnetic means automatically to increase and decrease, in response to such accelerations, the magnitude of the torque exerted on said member by said magnetic element, whereby the period of oscillations of the compass is adjustable.

7. In a compass a pivot; a member supported by said pivot for rotation in azimuth; a magnetic element mounted on said member in pivots for tilting movement relatively to said member about an axis substantially normal to the magnetic axis of said element and spaced from the center of gravity of said element; and a spring connected to bias said element towards a predetermined inclination relatively to said member about said normal axis.

8. In a compass a pivot; a member supported by said pivot for rotation in azimuth; a magnetic element mounted on said member in pivots for tilting movement relatively to said member about an axis substantially normal to the magnetic axis of said element and spaced from the center of gravity of said element; a spring connected to bias said element towards a predetermined inclination relatively to said member; and a damping liquid acting on said member tending to oppose movements of said member in azimuth about said normal axis.

9. In a compass a member mounted for rotation in azimuth; an electromagnet mounted on said member tending to maintain said member fixed in azimuth; and means responsive to accelerations acting on said compass and connected to increase and decrease, in response to such accelerations, a flow of current through said magnet.

10. In a compass a member mounted for rotation in azimuth; a damping fluid acting on said member tending to oppose movements of said member in azimuth; an electromagnet mounted on said member tending to maintain said member fixed in azimuth; a rheostat connected to increase and decrease a flow of current through said electromagnet; and a mass resiliently supported to become responsive to accelerations, said mass being connected to adjust said rheostat in response to its movements, whereby the electromagnetic force of said magnet is adjusted in response to accelerations.

11. In a compass for use on movable craft a member mounted for rotation in azimuth; an electromagnet mounted on said member tending to maintain said member fixed in azimuth; damping means tending to oppose movements in azimuth of said member by a torque exerted on said member upon movements of said member in azimuth; and means responsive to evolutions of the craft and connected to increase and decrease, in response to such evolutions, a flow of current through said electromagnet, whereby the directional force of said electromagnet with respect to the earth's magnetic field is increased and decreased and the period of oscillation of the compass made adjustable.

PAUL KOLLSMAN.